United States Patent

[11] 3,602,052

| [72] | Inventor | Konrad Frost |
| | | Berlin, Germany |
| [21] | Appl. No. | 843,466 |
| [22] | Filed | July 22, 1969 |
| [45] | Patented | Aug. 31, 1971 |
| [73] | Assignee | Hermann Prauter |
| | | Ludwigsburg, Wurttemberg, Germany |
| [32] | Priority | July 27, 1968 |
| [33] | | Germany |
| [31] | | P 17 75 321.8 |

[54] RAM DRIVE WITH ADJUSTABLE STROKE
4 Claims, 3 Drawing Figs.

[52] U.S. Cl. .................................................. 74/40,
83/628, 83/632
[51] Int. Cl. ..................................................... F16h 21/32,
B26d 5/16, B26d 5/14
[50] Field of Search ......................................... 74/40, 571
R, 61; 83/628, 632

[56] References Cited
UNITED STATES PATENTS

| 2,067,049 | 1/1937 | Goldberg...................... | 74/40 |
| 2,942,484 | 6/1960 | Dibb............................. | 74/40 |
| 2,211,044 | 8/1940 | Ashton.......................... | 83/632 |
| 2,568,761 | 9/1951 | Peyrebrune................... | 74/571 |
| 2,592,237 | 4/1952 | Bradley......................... | 74/571 |

FOREIGN PATENTS

| 942,309 | 10/1956 | Germany...................... | 74/40 |
| 1,177,877 | 12/1958 | France.......................... | 74/40 |

*Primary Examiner*—William F. O'Dea
*Assistant Examiner*—Wesley S. Ratliff, Jr.
*Attorney*—William K. Serp

ABSTRACT: An adjustable reciprocating motion drive mechanism which includes a pair of eccentrics coupled by means of a link assembly. Each of the eccentrics is mounted upon a spur gear, and both of the spur gears engage a drive gear driven by a motor. The link assembly connecting the eccentrics is secured to a ram spindle for example of a gear-shaping machine having mounted thereon a generating cutter. Means are provided for varying the position of the spur gears upon which the eccentrics are mounted so as to vary their angular relationship. Indicia are located upon the face of the drive gear as well as upon at least one of the spur gears to provide visual indication of the angular relationship of the eccentrics.

RAM DRIVE WITH ADJUSTABLE STROKE

BACKGROUND OF THE INVENTION

This invention relates to a drive for a reciprocating motion mechanism having an adjustable stroke length. With respect to certain machine tool components such as the ram spindle of a gear-shaping machine, the reciprocating motion is produced by means of eccentrics connected through spur gears. The position of eccentricity of the eccentrics with respect to each other is adjustable. In this manner, a means is provided for adjusting the stroke to the desired length.

With respect to conventional gear-shaping machines, the length of the stroke is usually set by adjusting an overhanging connecting pin shifted along a T-slot in a rotary supporting disc. A particular disadvantage of this arrangement is that the overhanging connecting pin effectively acts as a spring. This spring action in turn affects the accuracy of the gear cutting process and consequently reduces the life of the generating cutter.

It is an object of the present invention to provide an adjustable ram drive which avoids the above-mentioned disadvantages in prior art mechanisms and which may be adjusted simply and quickly within a range of freely selectable stroke lengths.

Other objects and advantages of the invention will become apparent with reference to the following description and accompanying drawings which show an illustrated embodiment of this invention.

DESCRIPTION OF THE PREFERRED EMBODIMENT

Figure 1:
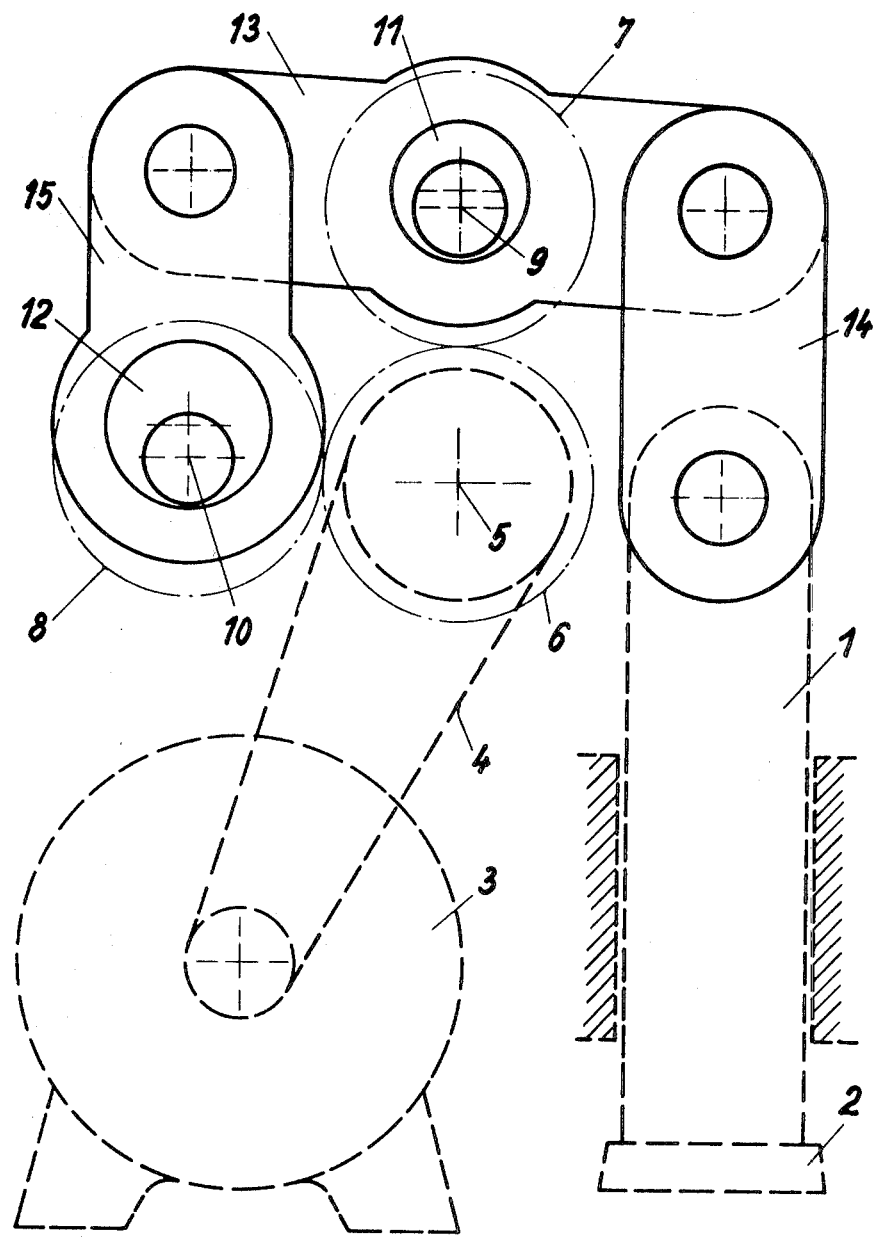
FIG. 1 is a schematic representation of a mechanism including certain features of this invention.

At the lowermost end of a ram spindle 1 of a gear-shaping machine is mounted a generating cutter 2. The driving power for the reciprocating motion is supplied by a motor 3 and transmitted through a belt drive 4 to a shaft 5 having a spur gear 6 mounted thereon. The spur gear 6 is engaged with spur gears 7 and 8 concentrically fixed to shafts 9 and 10 respectively. The shafts 9 and 10 respectively carry the eccentrics 11 and 12. A twin lever 13 is included with one arm thereof connected to the ram spindle 1 by means of a link 14. The remaining end of the lever 13 is connected to the eccentric 12 by means of a crank 15.

With respect to FIG. 1, the ratio between the spur gear 6 and gears 7 and 8 is 1:1. The twin lever 13 is provided with arms of equal length, and the size of the eccentric 12 is twice that of eccentric 11. With respect to the illustrated embodiment, the spindle 1 will not reciprocate when the eccentrics are in identical positions. However, when the two eccentrics are at opposed positions, the length of the stroke H can be expressed by the following formula wherein $E_1$ and $E_2$ are the respective maximum radii of the eccentrics:

$$H = 4E_1 \pm 2E_2$$

In a numerical example ($E_1$=10mm.; $E_2$=20 mm.) the minimum length of stroke is:

$$H_{min} = 4 \times 10 - 2 \times 20 = 0$$

and the maximum length of stroke is:

$$H_{max} = 4 \times 10 + 2 \times 20 = 80 \text{ mm.}$$

Figure 2:
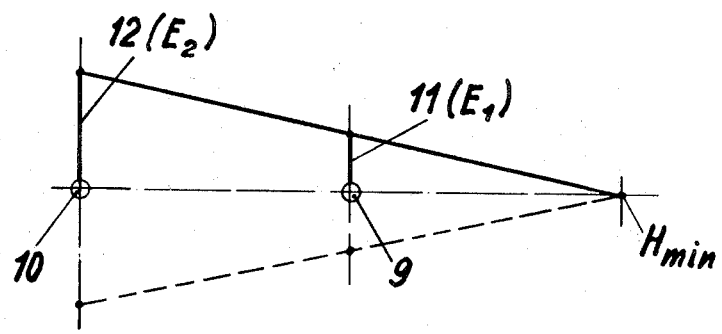
FIG. 2 is a geometric representation of the drive action with the eccentrics in identical positions.
Figure 3:
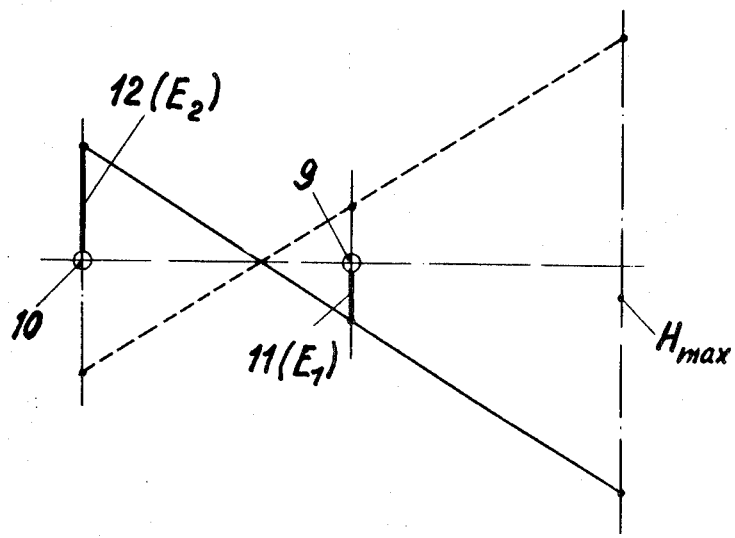
FIG. 3 is a geometric representation of the drive action with the eccentrics in opposed positions.

These two solutions are graphically represented in FIGS. 2 and 3 respectively.

Any desired stroke length between maximum and minimum may be obtained by varying the size of the eccentricities ($E_1$ and $E_2$) and/or the length of the arms of the twin lever 13 and by varying the point of engagement between the driving spur gears so as to change the angular relationship of the eccentrics.

A suitable means for determining the respective positions of the eccentricities includes marking with suitable indicia one of the spur gears 7 or 8 in a predetermined zero position before disengagement with the spur gear 6. To provide a visual indication of the amount of angular deviation between the two eccentrics, the engaged spur gear 7 or 8 may be provided with a zero marking, while the spur gear 6, acting as a common drive for both of said spur gears, is provided with suitable scale divisions.

Apart from machine tools, the present invention may be applied to any mechanism requiring a reciprocating motion and featuring adjustable stroke length. Although only one specific embodiment of this invention has been shown and described herein, it will be understood that certain details of the construction shown may be altered without departing from the spirit and scope of this invention.

I claim:

1. An apparatus for providing a reciprocating motion and featuring adjustable stroke length which is particularly adapted for driving the ram spindle of a gear-shaping machine comprising a pair of first and second eccentrics, a lever having first and second ends and a portion therebetween mounted about said first eccentric, first linkage means connecting said first end to said second eccentric, a second linkage means connecting said second end to said ram spindle, a motor drivingly coupled to each of said eccentrics and adjustment means for adjusting the relative positions of each of said eccentrics.

2. An apparatus in accordance with claim 1 wherein said drive mechanism further includes a first gear drivingly coupled with said first eccentric, a second gear drivingly coupled with said second eccentric and a third gear coupled to the drive shaft of said motor, said first and second gears being engaged with said third gear.

3. An apparatus in accordance with claim 2 wherein said eccentric adjusting means comprises means for varying the angular position of said first and second eccentric with respect to each other by shifting the point of mesh of at least one of said first and second gears with respect to said third gear.

4. An apparatus in accordance with claim 3 wherein at least one of said first and second gears of said drive mechanism are provided with indicia thereon and further wherein said third gear is additionally provided with suitable indicia thereon so as to provide visual indication of the relative positions of each of said gears.

UNITED STATES PATENT OFFICE
CERTIFICATE OF CORRECTION

Patent No. 3,602,052      Dated August 31, 1971

Inventor(s)    Konrad Frost

It is certified that error appears in the above-identified patent and that said Letters Patent are hereby corrected as shown below:

The assignee's name in the above-identified patent was misspelled upon printing the patent. Therefore, the name of the assignee as it appears on the patent should be changed from Hermann "Prauter" to Hermann "Pfauter".

Signed and sealed this 8th day of August 1972.

(SEAL)
Attest:

EDWARD M. FLETCHER, JR.      ROBERT GOTTSCHALK
Attesting Officer            Commissioner of Patents